Aug. 13, 1935. F. C. HANNAFORD 2,011,244
MEANS FOR MOLDING AND COMPRESSING PERISHABLE FOODSTUFFS FOR QUICK FREEZING
Filed April 20, 1932 2 Sheets-Sheet 1
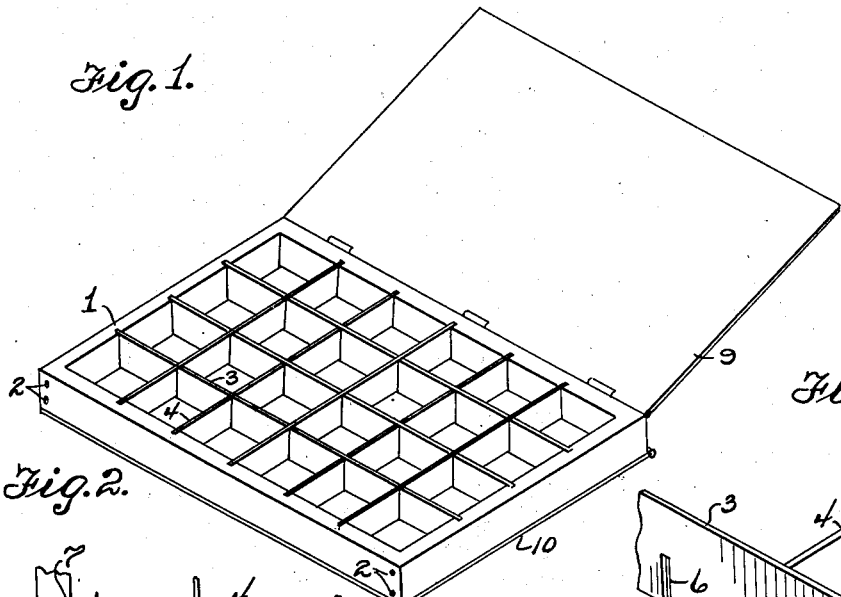
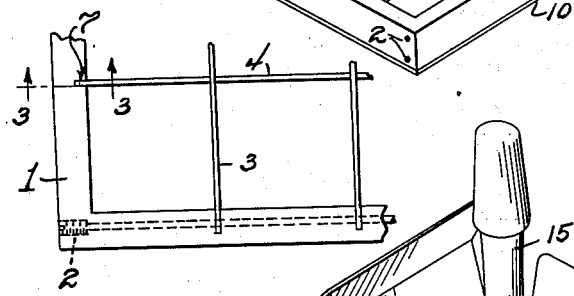
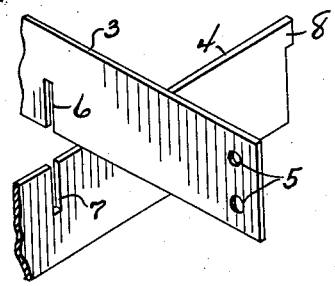
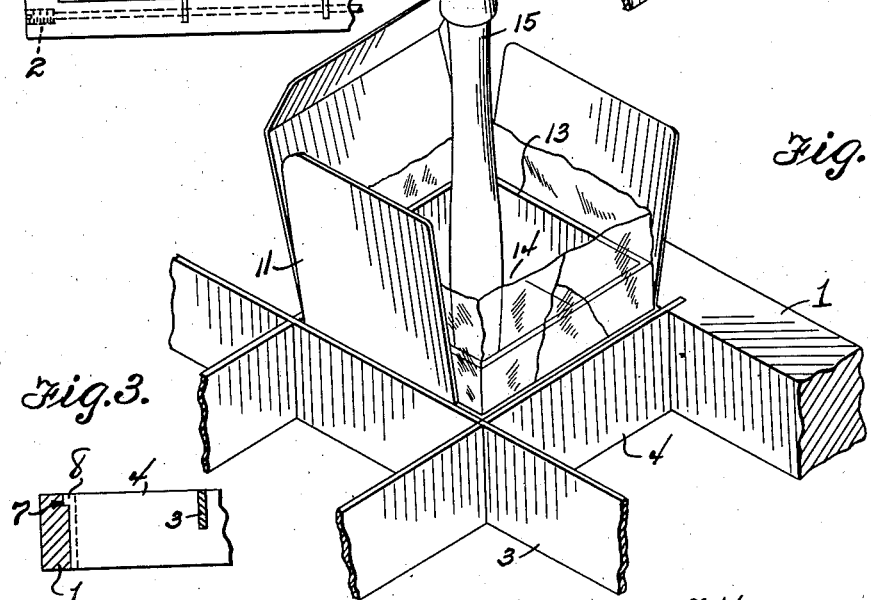
FREDERICK C. HANNAFORD INVENTOR
BY Victor J. Evans and Co. ATTORNEY Aug. 13, 1935.     F. C. HANNAFORD     2,011,244
MEANS FOR MOLDING AND COMPRESSING PERISHABLE FOODSTUFFS FOR QUICK FREEZING
Filed April 20, 1932     2 Sheets-Sheet 2
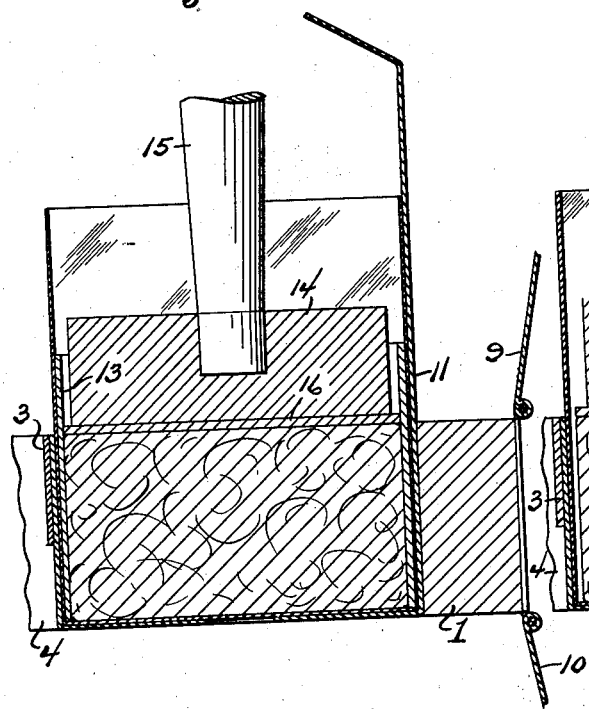
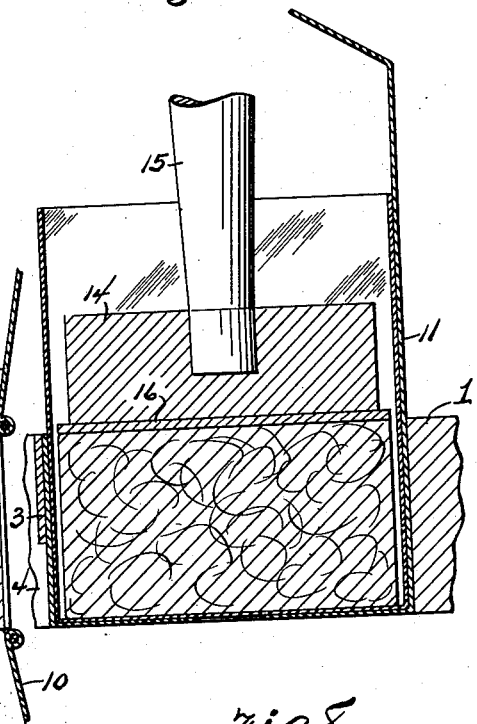
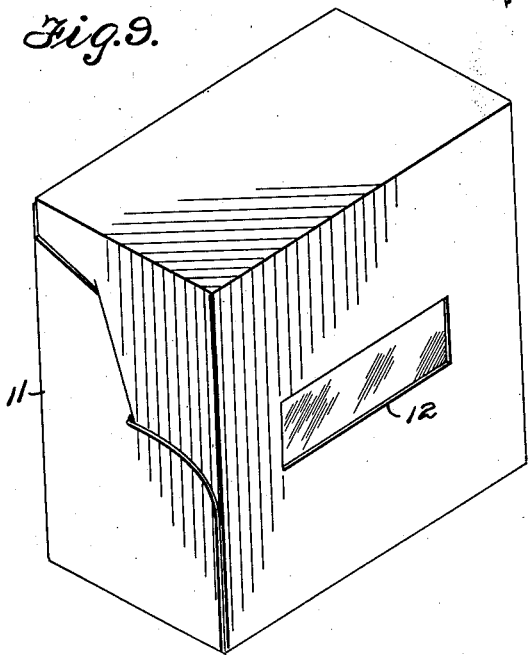
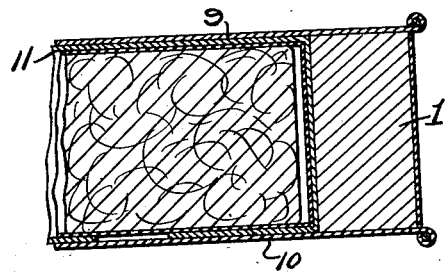
FREDERICK C. HANNAFORD
INVENTOR
BY Victor J. Evans and Co. ATTORNEY Patented Aug. 13, 1935

2,011,244

UNITED STATES PATENT OFFICE 2,011,244

MEANS FOR MOLDING AND COMPRESSING PERISHABLE FOODSTUFFS FOR QUICK FREEZING

Frederick C. Hannaford, Morgan City, La.

Application April 20, 1932, Serial No. 606,510

1 Claim. (Cl. 62—114)

My present invention has reference to a means for shaping, molding and compressing perishable foodstuffs into packages for quick freezing. In the freezing of any sea food, fruit or vegetables by sharp or quick freezing process, it is very essential that the extreme coldness be applied to the food to be frozen as quickly as possible at the lowest temperature, and when this is done with solid carbon dioxide or any brine or chemical that will create a temperature from 10° to 150° below Fahrenheit, such cold temperatures must be transmitted to the food in the packages so swiftly that the food cells and juices in the cells are not bursted, separated or broken up by the crystallization of the fluids in the cells, and it is, therefore, the object of this invention to produce a method and means for obtaining this result.

The invention will be comprehensively and fully understood from the following description which is to be read in connection with the accompanying drawings.

In the drawings:

Figure 1 is a perspective view of the form frame employed.

Figure 2 is a detail plan view looking toward one of the corners of the frame.

Figure 3 is a detail sectional view approximately on the line 3—3 of Figure 2.

Figure 4 is a perspective view to illustrate the manner in which the division plates and frame are interlocked with each other.

Figure 5 is a detail perspective view illustrating the manner in which the food is packed in the freezing or form frame.

Figure 6 is a sectional view through the portion of the device disclosed by Figure 5.

Figure 7 is a similar view with the mold filler removed.

Figure 8 is a detail longitudinal sectional view showing the cover plates for the freezing form frame swung thereover and against a packed box or package of foodstuff which is arranged in the frame.

Figure 9 is a perspective view of the box or package employed.

The freezing form frame which is employed in my improved means is of aluminum, the sides and ends being welded together and the frame is additionally reinforced for contraction and expansion by heavy brass screws 2 that are threaded in openings in the end members of the frame. The form in the frame, comprises aluminum plates or strips 3 and 4, respectively. The strips 3 have their ends provided with openings 5 through which pass the brass screws 2 and the said strips 3 from their lower edges are provided with equidistantly spaced notches 6. It should be stated that the inner face of the form 1 has notches or slots for the reception of the ends of the strips 3 and 4.

The strips 4 have notches 7 that enter from their upper edges for the passage of the notched portions 5 of the strips 3 to establish an interlocking joint between the strips 3 and 4. The grooves or slots at the confronting faces of the front and rear of the frame 1 communicate with notches 7 that enter from the top of the said members of the frame, and these notches receive therein corner projections 8 on the upper edges of the strips 4. By this arrangement it will be noted that the mold strips are effectively held in locking engagement and likewise securely held in the frame 1. By removing the brass screws 2 certain of the strips may be removed to vary the size of the forms.

Hingedly secured to the rear of the frame 1 there are top and bottom cover plates 9 and 10, respectively. The box or packages for the food stuff, which may be in the nature of sea foods, such as fish, oysters, shrimp, crabs, etc., and which may be in the nature of fruits, syrups, berries or juices, are constructed of paraffined jute manila and are of a size to fit the forms provided by the strips 3 and 4. The jute manila boxes 11 have both their inner and outer faces treated with paraffine, and the said boxes are constructed each from a single blank of material and scored to form the same into proper shape and the top of each box or package 11 is provided with flaps designed to be folded over each other for sealing the box or package. Also each box or package may and preferably has its outer face provided with a window 12.

When the box or package is arranged in one of the molds as disclosed by Figures 5, 6 and 7 of the drawings I arrange in the said box or package an aluminum member which I will term a mold filler and which is indicated in the drawings by the numeral 13. The mold filler is of a greater height than the body of the box and is of a size and shape corresponding to that of the box. Before the mold filler is placed in the box I fold therearound a sheet of cellophane which has its top open but its bottom closed. The food or merchandise to be placed in a box to be frozen is weighed and poured into the mold filler and is forced into the filler by the plunger 14 that is operated by a handle 15. The head of the plunger preferably has fixed on its outer face an aluminum plate 16 which is of a size corresponding with the interior shape and diameter of the mold filler 13. A pressure on the plunger is exerted so that the foodstuff may be forced into the mold filler down to the level of the form frame. The plunger is held against the foodstuff and the mold filler is lifted out of the box, thus leaving the food or merchandise inside of the cellophane liner forming a perfect package, form and mold, and at the same time forming the cellophane into the box in perfect shape for a perfect seal over the food inside of the paraffine jute manila box. Over the folded top of the cellophane the flaps comprising the top of the box 11 are folded, thus closing and sealing the package. When the merchandise is packed in all of the forms the cover plates 9 and 10 are swung over the freezing form plates 1 and whereby each box in the form is entirely enclosed on every side with aluminum. Aluminum is a quick conductor and retainer of cold and will rapidly conduct the cold through the paper and cellophane so that the packed food is quickly frozen, and the package and food is retained in perfect shape and condition by the form frame. The freezing means may be in the nature of solid carbon dioxide or any other brine system of sharp and quick freezing. Among the advantages of the invention may be mentioned the form frame which greatly increases the conductivity of cold to all sides and edges of the box and package, the manner in which the form frame holds the package to be frozen in perfect shape, the said box or package not being broken by contraction and expansion of the extreme cold to which it is subjected. All packages or boxes may be molded the same size and shape, enabling the packing, packaging, storing and shipping of the packages in a solid mass, closely packed together and, therefore, requiring less refrigeration in storage or transit than would be required to retain each individual box in its frozen state. The package is formed into a perfect form as to contour and shape, with the least handling, thereby making the package sanitary from human touch, in the method of inserting the food into the packages through the mold and filler and aid of plunger. The cellophane may be perfectly folded around the mold filler and inserted in the box or package after the box is in the form frame and the mold filler protects the cellophane protruding from the top of the box, from becoming broken, soiled or disarranged and after the mold filler is removed from the box the cellophane may be moved down over the food, making a complete seal from moisture or vapor, and the top of the box being closed while the box is in the frame. After the box is frozen in the form frame it is perfectly sealed with the cellophane inside of the box and the box is formed into a perfect frozen package. The boxes, cellophane and the food can be packed into the form frame in continuous consecutive order which greatly increases the rapidity of the forming of the package, and the placing of the food in the package to render the same instantly ready for freezing. After the package is frozen it is easily removed from the frame and is ready for packing, or storing without additional handling. The package being in perfect shape and form makes a perfect package to pack, ship or store, and can be kept indefinitely with the right temperature in the exact shape it was removed from the form frame, and being in perfect shape it can be packed to ship with solid carbon dioxide, in corrugated containers occupying the very smallest space, packing into solid form, with the least voids, thereby requiring the minimum refrigeration in transit. After the package reaches the distributor or retailer, it may be packed in their refrigerator or display case for the most advantageous display. The contents of the box are discernible through the window 12 which is covered by the cellophane container.

The freezing frame or form is made adjustable to different size packages to be frozen by the removal of the partition strips of aluminum in the frame.

The covers of the frame may be arranged with lips or grooves, whereby the frame may be used in any brine system of freezing, where brine is sprayed upon the frame or mold as it travels on a movable conveyor belt, or it may be used in a diving bell that is immersed into the freezing brine. This frame may be used in any system of freezing either with sprayed brine or immersed in brine and in cold air freezing, and give the same results as to forming the packages into perfect shape into the frozen state.

Then in the matter of freezing liquids, all kinds of liquids may be packed, packaged, closed into this frame and frozen into solid state in perfect shape, such as liquids of soups, broths, water ices, ice cream, sherbets, juices of fruits and berries, etc. In fact, anything in liquid shape that will freeze, will form a perfect package, and may be used in any of the different systems of freezing.

Having described the invention, I claim:

A quick freezing mold for the purpose set forth, comprising a substantially rectangular body frame, having its faces provided with equidistantly spaced notches, plates having their ends received in the notches and having notches in their contacting portions for interengagement, screws passing through the body frame and through the plates in a line with the sides of said frame for holding all the plates in the frame, and said plates providing therebetween and with the body frame mold cells, hinged cover plates for covering the cells and mold frame, and said plates, frame and covers being constructed of metal having a high cold conductivity.

FREDERICK C. HANNAFORD.